(12) United States Patent
Gumpoltsberger et al.

(10) Patent No.: US 8,663,056 B2
(45) Date of Patent: Mar. 4, 2014

(54) MULTI-RATIO TRANSMISSION

(75) Inventors: Gerhard Gumpoltsberger, Friedrichshafen (DE); Christian Sibla, Friedrichshafen (DE); Stefan Beck, Eriskirch (DE); Josef Haupt, Tettnang (DE); Gert Bauknecht, Friedrichshafen (DE); Peter Ziemer, Tettnang (DE)

(73) Assignee: ZF Friedrichshafen AG, Friedrichshafen (AG)

( * ) Notice: Subject to any disclaimer, the term of this patent is extended or adjusted under 35 U.S.C. 154(b) by 218 days.

(21) Appl. No.: 13/384,632

(22) PCT Filed: Aug. 19, 2010

(86) PCT No.: PCT/EP2010/062129
§ 371 (c)(1),
(2), (4) Date: Jan. 18, 2012

(87) PCT Pub. No.: WO2011/020897
PCT Pub. Date: Feb. 24, 2011

(65) Prior Publication Data
US 2012/0115672 A1 May 10, 2012

(30) Foreign Application Priority Data

Aug. 20, 2009 (DE) .................. 10 2009 028 709

(51) Int. Cl.
*F16H 3/44* (2006.01)
*F16H 3/62* (2006.01)
(52) U.S. Cl.
USPC ............................ 475/284; 475/276; 475/311
(58) Field of Classification Search
USPC .................................. 475/276, 284
See application file for complete search history.

(56) References Cited

U.S. PATENT DOCUMENTS

| 4,683,776 A | 8/1987 | Klemen |
| 6,558,287 B2 | 5/2003 | Hayabuchi et al. |

(Continued)

FOREIGN PATENT DOCUMENTS

| DE | 26 36 969 A1 | 2/1978 |
| DE | 199 49 507 A1 | 4/2001 |

(Continued)

OTHER PUBLICATIONS

Gumpoltsberger, Gerhard: Systematic Synthesis and Evaluation of Multi-Stage Planetary Transmissions, Dissertation TU Chemnitz, 2007, pp. 1-210.

(Continued)

*Primary Examiner* — David D Le
*Assistant Examiner* — Colby M Hansen
(74) *Attorney, Agent, or Firm* — Davis & Bujold, PLLC; Michael J. Bujold

(57) ABSTRACT

A transmission comprising four gear sets (P1, P2, P3, P4), eight shafts and six shift elements. The drive shaft is connected with sun gear of set (P1) and carrier of set (P4). Carrier of set (P1) is connected to shaft (3) which is connectable to a housing, via a first brake, and connectable to shaft (5), via clutch (35). Shaft (5) interconnects the ring gear of set (P2) with the sun gears of sets (P3, P4). Shaft (6) interconnects ring gear of set (P1) with carrier of set (P2). Shaft (4) couples sun gear of set (P2) to the housing, via a brake. Ring gear of set (P3) is connected to the housing. The output shaft is connectable, via clutch (27), with shaft (7) which is connected to ring gear of set (P4) and, via clutch (28), with shaft (8) which is connected to carrier of set (P3).

4 Claims, 2 Drawing Sheets

(56) References Cited

U.S. PATENT DOCUMENTS

| | | |
|---|---|---|
| 6,634,980 B1 | 10/2003 | Ziemer |
| 6,960,149 B2 | 11/2005 | Ziemer |
| 7,549,942 B2 | 6/2009 | Gumpoltsberger |
| 7,699,743 B2 | 4/2010 | Diosi et al. |
| 7,985,159 B2 * | 7/2011 | Phillips et al. ............ 475/284 |
| 8,210,983 B2 * | 7/2012 | Gumpoltsberger et al. .. 475/284 |
| 8,231,496 B2 * | 7/2012 | Gumpoltsberger et al. .. 475/275 |
| 8,231,501 B2 * | 7/2012 | Gumpoltsberger et al. .. 475/284 |
| 8,246,504 B2 * | 8/2012 | Gumpoltsberger et al. .. 475/286 |
| 8,251,859 B2 * | 8/2012 | Gumpoltsberger et al. .. 475/284 |
| 8,403,803 B2 * | 3/2013 | Gumpoltsberger et al. .. 475/276 |
| 2008/0261756 A1 | 10/2008 | Carey et al. |
| 2009/0048059 A1 | 2/2009 | Phillips et al. |
| 2012/0135835 A1 * | 5/2012 | Gumpoltsberger et al. .. 475/276 |

FOREIGN PATENT DOCUMENTS

| | | |
|---|---|---|
| DE | 101 15 995 A1 | 10/2002 |
| DE | 102 13 820 A1 | 10/2002 |
| DE | 10 2005 010 210 A1 | 9/2006 |
| DE | 10 2006 006 637 A1 | 9/2007 |
| DE | 10 2008 016 084 A1 | 10/2008 |
| DE | 10 2008 000 428 A1 | 9/2009 |
| JP | 2005 036955 A | 2/2005 |
| JP | 2006-349153 A | 12/2006 |
| WO | 2009/106408 A1 | 9/2009 |

OTHER PUBLICATIONS

Gumpoltsberger, Gerhard: Synthesis of Planetary Transmissions, ZF Friedrichshafen AG, 2009, 13 pages, Germany.

* cited by examiner

|  | 03 | 04 | 13 | 27 | 28 | 35 | i | phi |
|---|---|---|---|---|---|---|---|---|
| 1. GEAR |  | X |  |  | X | X | 5.875 | 1.799 |
| 2. GEAR |  |  | X |  | X | X | 3.266 | 1.492 |
| 3. GEAR |  | X | X |  | X |  | 2.189 | 1.402 |
| 4. GEAR |  | X |  | X | X |  | 1.561 | 1.308 |
| 5. GEAR |  | X | X | X |  |  | 1.193 | 1.193 |
| 6. GEAR |  |  | X | X |  | X | 1.000 | 1.146 |
| 7. GEAR |  | X |  | X |  | X | 0.872 | 1.160 |
| 8. GEAR | X |  |  | X |  | X | 0.752 | 1.152 |
| 9. GEAR | X | X |  | X |  |  | 0.653 | 8.999 |
| R GEAR | X | X |  |  | X |  | -5.308 | -0.903 |

Fig. 3

MULTI-RATIO TRANSMISSION

This application is a National Stage completion of PCT/EP2010/062129 filed Aug. 19, 2010, which claims priority from German Application No. 10 2009 028 709.4 filed Aug. 20, 2009.

FIELD OF THE INVENTION

The present invention relates to a multi-stage transmission of a planetary design, in particular an automatic transmission for a motor vehicle, according to the preamble of claim 1.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

Such an automatic transmission is known, for example, from the applicant's patent DE 199 49 507 A1, according to which two non-shiftable front-mounted gear sets are provided on the drive shaft and generate two rotational speeds on the output side, which, in addition to the rotational speed of the drive shaft, can be selectively meshed with a shiftable double planetary gear set acting on the output shaft by selective engagement of the shift elements such that only one of the two currently actuated shift elements must be engaged or disengaged to shift from one gear to the next higher or lower gear.

By using five shift elements, seven forward gears are obtained; by using six shift elements, nine or ten forward gears are obtained.

Furthermore, patent DE 102 13 820 A1 makes known a multi-speed automatic transmission with eight forward gears and one reverse gear, which comprises a first input path T1 of a first transmission ratio; an input path T2 that has a higher transmission ratio than that of input path T1; a Ravigneaux type planetary gear set with four elements, namely, a first element, a second element, a third element and a fourth element in the sequence of elements in a rotational speed diagram; a clutch C-2 which transfers rotation of the input path T2 to the first element S3; a clutch C-1, which transfers rotation from the input path T2 to the fourth element S2; a clutch C-4, which transfers rotation from the input path T1 to the first element; a clutch C-3, which transfers rotation from the input path T1 to the second element C3; a brake B-1, which produces meshing of the fourth element; a brake B-2, which produces meshing of the second element; and an output element that is coupled to the third element S3.

Furthermore, a nine-speed multi-step transmission is known from DE 29 36 969 A1; it comprises eight shift elements and four gear sets, wherein one gear set serves as a front-mounted gear set and the main gearing includes a Simpson set and a further gear set serving as reverse gearing.

Further multi-step transmissions are known, for example, from the applicant's DE 102005010210 A1 and DE 102006006637 A1.

Automatically shiftable vehicle transmissions, of the planetary design, are already generally described numerous times in the prior art and are continually undergoing further development and improvement. These transmissions should have a relatively simple design, in particular requiring a low number of shift elements, and minimize the need for double shifting when sequential shifting is performed, thereby ensuring that only one shift element is ever switched when shifting is performed in defined groups of gears.

The applicant's document, DE 102008000428.3 which is not yet published, discloses a multi-step transmission of a planetary design that includes an input shaft and an output shaft which are disposed in a housing. The known transmission includes at least four planetary gear sets which are designated, in the following, as the first, second, third, and fourth planetary gear set, at least eight rotatable shafts which are designated in the following as the drive shaft, output shaft, third, fourth, fifth, sixth, seventh, and eighth shaft, and at least six shift elements comprising brakes and clutches, whose selected engagement produces different transmission ratios between the input shaft and the output shaft, and therefore preferably nine forward gears and one reverse gear can be realized.

The first and second planetary gear sets, which are preferably designed as minus planetary gear sets, form a shiftable front-mounted gear set, wherein the third and fourth planetary gear sets form a main gear set.

In the known multi-step transmission, the carriers of the first and second planetary gear sets are coupled together via the fourth shaft which is connected to an element of the main gear set, the ring gear of the first planetary gear set is coupled to the sun gear of the second planetary gear set via the eighth shaft, which is detachably connectable to the drive shaft via the first clutch, and the sun gear of the first planetary gear set can be coupled to a housing of the transmission by means of the third shaft, via a first brake, and is detachably connectable to the drive shaft via a second clutch, wherein the ring gear of the second planetary gear set can be coupled to a housing of the transmission by means of the fifth shaft via a second brake. In addition, the seventh shaft is constantly connected to at least one element of the main gear set, and can be coupled to a housing of the transmission via a third brake, wherein the sixth shaft is constantly connected to at least one further element of the main gear set and is detachably connectable to the drive shaft, via a third clutch; the output shaft is constantly connected at least to one further element of the main gear set.

In the known transmission, the fourth shaft is preferably constantly connected to the ring gear of the third planetary gear set, wherein the sixth shaft is constantly connected to the ring gear of the fourth planetary gear set and to the carrier of the third planetary gear set, and is detachably connectable to the drive shaft via the third clutch. Furthermore, the seventh shaft is constantly connected to the sun gears of the third and fourth planetary gear sets, and can be coupled to a housing of the transmission via the third brake. In this case, the output drive is produced via the output shaft that is constantly connected to the carrier of the fourth planetary gear set. Furthermore, the third and fourth planetary gear sets can be combined or reduced to a Ravigneaux set having a common carrier and a common ring gear.

SUMMARY

The object of the present invention is to propose a multi-step transmission of the initially described type, which has nine forward gears and at least one reverse gear having a sufficient transmission ratio, in which the design complexity and the overall size, in particular the overall length and the weight, are optimized, and in which efficiency is improved with respect to drag losses and gearing losses. In addition, in the multi-step transmission according to the invention, minimal support moments should act on the shift elements. The transmission, according to the invention, should be particularly suited for a front transverse installation.

Accordingly, a multi-step transmission, according to the invention, of a planetary design is proposed which has an input shaft and an output shaft which are disposed in a housing. In addition, there are provided at least four planetary gear sets which are designated, in the following, as the first, second, third, and fourth planetary gear sets, eight rotatable shafts which are designated, in the following, as the drive shaft, output shaft, third, fourth, fifth, sixth, seventh, and eighth shaft, and at least six shift elements comprising brakes and clutches, whose selected engagement produces different transmission ratios between the drive shaft and the output shaft, and therefore preferably nine forward gears and one reverse gear can be realized.

The planetary gear sets, viewed axially, are disposed in the sequence of first planetary gear set, second planetary gear set, third planetary gear set, fourth planetary gear set, and are preferably designed as minus planetary gear sets.

As is well known, a simple minus planetary gear set comprises a sun gear, a ring gear, and a carrier on which the planetary gears are rotatably supported, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear and a carrier, on which inner and outer planet gears are rotatably supported, wherein all inner planet gears mesh with the sun gear and all outer planet gears mesh with the ring gear, wherein each inner planet gear meshes with only one outer planet gear. As a result, when the carrier is fixed, the ring gear has the same direction of rotation as the sun gear.

According to a preferred embodiment of the invention, the sun gear of the first planetary gear set is connected to the drive shaft, wherein the carrier of the first planetary gear set is connected to the third shaft which can be coupled to a housing of the transmission via a first brake and is detachably connected to the fifth shaft via a second clutch, wherein the fifth shaft is connected to the ring gear of the second planetary gear set, to the sun gear of the third planetary gear set, and to the sun gear of the fourth planetary gear set, and the drive shaft is connected to the carrier of the fourth planetary gear set.

Furthermore, the ring gear of the first planetary gear set is connected to the sixth shaft, which is connected to the carrier of the second planetary gear set, the ring gear of the third planetary gear set is coupled to a housing of the transmission, the sun gear of the second planetary gear set is connected to the fourth shaft, which can be coupled to a housing of the transmission via a second brake, and wherein the output shaft is detachably connectable, via a third clutch, to the seventh shaft, which is connected to the ring gear of the fourth planetary gear set, and, via a fourth clutch, to the eighth shaft, which is connected to the carrier of the third planetary gear set.

It is provided that the first planetary gear set can be blocked by engaging a first clutch, wherein the first clutch is preferably designed as a clutch that detachably connects the third shaft to the drive shaft, or as a clutch that detachably connects the third shaft to the sixth shaft.

The embodiment of the multi-step transmission, according to the invention, results in transmission ratios that are particularly suitable for passenger vehicles, and in a greater overall gear ratio of the multi-step transmission, thereby improving driving smoothness and significantly reducing fuel consumption.

Furthermore, design complexity is significantly reduced with the multi-step transmission, according to the invention, due to a low number of shift elements. Using the multi-step transmission according to the invention, it is advantageously possible to perform a start-up using a hydrodynamic converter, an external start-up clutch, or any other suitable external start-up element. It is also conceivable to perform a start-up using a start-up element integrated in the transmission. Preferably, a shift element that is actuated in the first forward gear and in the reverse gear is suitable.

Moreover, the multi-step transmission, according to the invention, results in good efficiency in the main drive gears with respect to drag losses and gearing losses.

Furthermore, low moments are present in the shift elements and in the planetary gear sets of the multi-step transmission, thereby advantageously reducing wear in the multi-step transmission. In addition, the low moments make it possible to utilize correspondingly low dimensions, thereby reducing the necessary installation space and related costs. Furthermore, the rotational speeds of the shafts, shift elements, and planetary gear sets are low.

In addition, the transmission, according to the invention, is designed to allow adaptability to different drive train embodiments in terms of power flow direction and spatial aspects.

BRIEF DESCRIPTION OF THE DRAWINGS

The invention is described in greater detail in the following, as an example, with reference to the attached figures. They show:

FIG. 3: an example of a shift pattern for a multi-step transmission according to FIG. 1.

DETAILED DESCRIPTION OF THE DRAWINGS

Figure 1:
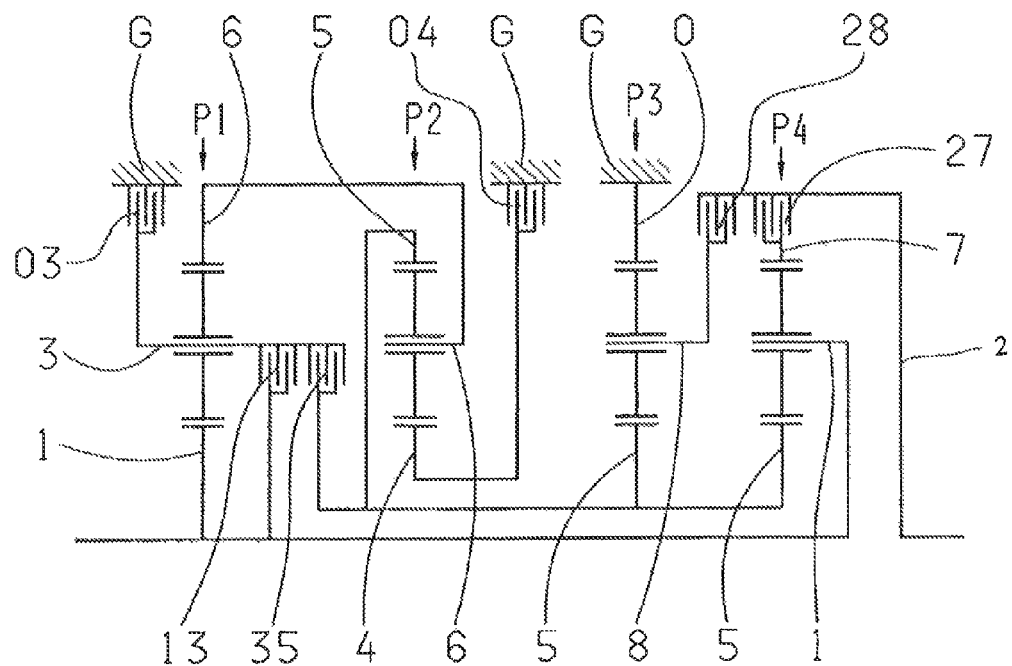
FIG. 1: a schematic view of a first preferred embodiment of a multi-step transmission according to the invention.

FIG. 1 shows a multi-step transmission, according to the invention, which has a drive shaft 1, an output shaft 2, and four planetary gear sets P1, P2, P3 and P4 which are disposed in a housing G. Planetary gear sets P1, P2, P3 and P4, in the example shown in FIG. 1, are designed as minus planetary gear sets. According to the invention, at least one planetary gear set can be implemented as a plus planetary gear set if the carrier and ring gear connection are exchanged and, simultaneously, the value of the stationary transmission ratio is increased by 1 in comparison to the embodiment as a minus planetary gear set.

In the embodiment shown, the planetary gear sets, viewed axially, are disposed in the sequence P1, P2, P3 and P4.

As shown in FIG. 1, six shift elements are provided, namely, two brakes, 03, 04 and four clutches 13, 27, 28 and 35. The spatial disposition of the shift elements can be arbitrary, and is limited only by the dimensions of the outer design. The clutches and the brakes of the transmission are preferably implemented as friction shift elements or lamellar shift elements.

Selective shifting of nine forward gears and one reverse gear can be realized using these shift elements. The multi-step transmission, according to the invention, has a total of eight rotatable shafts, namely, the shafts 1, 2, 3, 4, 5, 6, 7 and 8, wherein the drive shaft is the first shaft, and the output shaft is the second shaft of the transmission.

According to the invention, the sun gear of the first planetary gear set P1 is connected to the drive shaft 1 of the multi-step transmission, as shown in FIG. 1, wherein the carrier of the first planetary gear set P1 is connected to the third shaft 3 which can be coupled, via a first brake 03, to a housing G of the transmission, and is detachably connectable, via a first clutch 13, to the drive shaft 1, and, via a second clutch 35, to the fifth shaft 5. By engaging the first clutch 13, the first planetary gear set P1 can be blocked by coupling the sun gear to the carrier.

As shown in FIG. 1, the fifth shaft 5 is connected to the ring gear of the second planetary gear set P2, to the sun gear of the third planetary gear set P3, and to the sun gear of the fourth planetary gear set P4, wherein the drive shaft 1 is connected to the carrier of the fourth planetary gear set P4.

According to the invention, as shown in FIG. 1 the ring gear of the first planetary gear set P1 is connected to the sixth shaft 6 which is connected to the carrier of the second planetary gear set P2, the ring gear of the third planetary gear set P3 is coupled to a housing G of the transmission (shaft 0), and the sun gear of the second planetary gear set P2 is connected to the fourth shaft 4, which can be coupled to a housing of the transmission G via a second brake 04. In the embodiment shown, the output shaft 2 is detachably connectable, via a fourth clutch 28, to the eighth shaft 8 which is connected to the carrier of the third planetary gear set P3, and, via a third clutch 27, to the seventh shaft 7 which is connected to the ring gear of the fourth planetary gear set P4.

The first clutch 13 and second clutch 35, viewed axially, can be arranged between the first and second planetary gear sets P1, P2. The third clutch 27 and fourth clutch 28, viewed axially, can be preferably arranged between the third and fourth planetary gear sets P3, P4.

Figure 2:
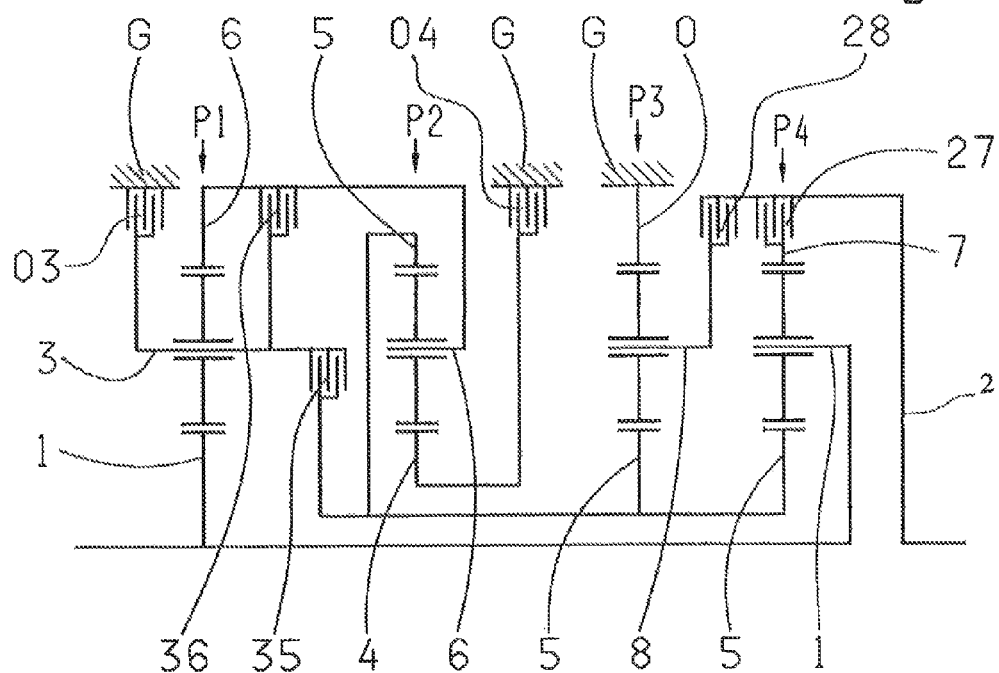
FIG. 2: a schematic view of a second preferred embodiment of a multi-step transmission according to the invention.

The embodiment shown in FIG. 2 differs from the embodiment in FIG. 1 in that the first clutch is designed as a clutch 36 via which the third shaft 3 is detachably connectable to the sixth shaft 6 thereby enabling the first planetary gear set P1 to be blocked by coupling the carrier of the first planetary gear set P1 to the ring gear of the first planetary gear set P1.

FIG. 3 shows an example of a shift pattern of a multi-step transmission according to FIG. 1. Three shift elements are engaged for every gear. The shift pattern shows, as examples, the particular transmission ratios i of the individual gear steps, and, to be determined therefrom, the gear increments or step changes phi to the next higher gear, wherein the value 8.999 is the transmission ratio spread.

Typical values for the stationary transmission ratios of the planetary gear sets P1, P2, P3 and P4 implemented as minus planetary gear sets are −1.953, −2.191, −2.235 and −2.404, respectively. FIG. 3 shows that double shifting or group shifting is avoided when shifting sequentially since two adjacent gear steps share two shift elements. It is also shown that a large transmission ratio spread is attained with small gear increments.

The first forward gear is attained by engaging the second brake 04 and the second and fourth clutches 35, 28; the second forward gear is attained by engaging the first, second and fourth clutches 13, 35, 28; the third forward gear is attained by engaging the second brake 04 and the first and fourth clutches 13, 28; the fourth forward gear is attained by engaging the second brake 04 and the third and fourth clutches 27, 28; the fifth forward gear is attained by engaging the second brake 04 and the first and third clutches 13, 27; the sixth forward gear, which is preferably implemented as direct drive, is attained by engaging the first, second and third clutch 13, 35, 27; the seventh forward gear is attained by engaging the second brake 04 and the second and third clutches 35, 27; the eighth forward gear is attained by engaging the first brake 03 and the second and third clutches 35, 27; and the ninth forward gear is attained by engaging the first and second brakes 03, 04 and the third clutch 27, wherein the reverse gear is attained by engaging the first and second brakes 03, 04 and the fourth clutch 28.

Since the second brake 04 and the fourth clutch 28 are engaged in the first forward gear and in the reverse gear, these shift elements can be used as start-up elements.

For the case in which, according to the embodiment depicted in FIG. 2, the first clutch is designed as a clutch 36 via which the third shaft 3 can be detachably connected to the sixth shaft 6, the speeds indicated in the shift pattern shown in FIG. 3 are attained with the difference that reference character 13 is replaced by reference character 36.

According to the invention, different gear increments can also result from the same gear pattern depending on the shift logic, thereby making it possible to realize an application-specific or vehicle-specific variation.

According to the invention, it is possible to provide additional freewheels at each suitable location of the multi-step transmission, for example, between a shaft and the housing, or possibly to connect two shafts.

According to the invention, an axle differential and/or a distributor differential can be disposed on the drive side or on the output side.

Within the scope of an advantageous development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. It is also possible to dispose such a start-up element in the power flow direction after the transmission wherein, in this case, the drive shaft 1 is continuously connected to the crankshaft of the engine.

The multi-step transmission, according to the invention, also makes it possible to situate a torsional-vibration damper between the engine and the transmission.

Within the scope of a further, embodiment of the invention (not shown) a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the drive shaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches.

A further advantage of the multi-step transmission presented here is that an electric machine can be attached to each shaft as a generator and/or as an additional drive machine.

Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS

1 First shaft, drive shaft
2 Second shaft, output shaft
3 Third shaft
4 Fourth shaft
5 Fifth shaft
6 Sixth shaft 7 Seven shaft
8 Eighth shaft
03 First brake
04 Second brake
13 First clutch
27 Third clutch
28 Fourth clutch
35 Second clutch
36 First clutch
P1 First planetary gear set
P2 Second planetary gear set
P3 Third planetary gear set
P4 Fourth planetary gear set
i Transmission ratio
phi Gear step change
G Housing

The invention claimed is:

1. A multi-step transmission of a planetary design for an automatic transmission for a motor vehicle, the multi-step transmission comprising:
   a drive shaft (1);
   an output shaft (2);
   first, second, third and fourth planetary gear sets (P1, P2, P3, P4) which are disposed within a housing (G); and
   a rotatable third shaft (3), a rotatable fourth shaft (4), a rotatable fifth shaft (5), a rotatable sixth shaft (6), a rotatable seventh shaft (7) and a rotatable eighth shaft (8) and at least six shift elements (03, 04, 13, 27, 28, 35, 36) comprising first and second brakes (03, 04) and first, second, third and fourth clutches (13, 27, 28, 35, 36) whose selected engagement produces different transmission ratios between the drive shaft (1) and the output shaft (2) so that nine forward gears and a reverse gear can be achieved;
   wherein a sun gear of the first planetary gear set (P1) is connected to the drive shaft (1), a carrier of the first planetary gear set (P1) is connected to the third shaft (3) which is connectable to the housing (G) of the transmission via the first brake (03) and is detachably connectable to the fifth shaft (5) via the second clutch (35);
   the fifth shaft (5) is connected to a ring gear of the second planetary gear set (P2), to a sun gear of the third planetary gear set (P3) and to a sun gear of the fourth planetary gear set (P4), and the drive shaft (1) is connected to a carrier of the fourth planetary gear set (P4);
   the sixth shaft (6) is connected to a ring gear of the first planetary gear set (P1) and to a carrier of the second planetary gear set (P2);
   a sun gear of the second planetary gear set (P2) is connected to the fourth shaft (4) which is connectable, via the second brake (04), to the housing (G) of the transmission;
   a ring gear of the third planetary gear set (P3) is coupled to the housing (G) of the transmission;
   the output shaft (2) is detachably connectable, via the fourth clutch (28), to the eighth shaft (8) which is connected to a carrier of the third planetary gear set (P3) and, via the third clutch (27), to the seventh shaft (7) which is connected to a ring gear of the fourth planetary gear set (P4); and
   the first planetary gear set (P1) can be blocked by engagement of the first clutch (13 or 36).

2. The multi-step transmission according to claim 1, wherein the first clutch (13 or 36) one of detachably connects the third shaft (3) to the drive shaft (1), and
   detachably connects the third shaft (3) to the sixth shaft (6).

3. The multi-step transmission according to claim 1, wherein the first, the second, the third and the fourth planetary gear sets (P1, P2, P3, P4) are each minus planetary gear sets.

4. The multi-stage transmission according to claim 1, wherein a first forward gear is attained by engagement of the second brake (04) and the second and the fourth clutches (35, 28);
   a second forward gear is attained by engagement of the first, the second and the fourth clutches (13 and 36, 35, 28);
   a third forward gear is attained by engagement of the second brake (04) and the first and the fourth clutches (13 and 36, 28);
   a fourth forward gear is attained by engagement of the second brake (04) and the third and the fourth clutches (27, 28);
   a fifth forward gear is attained by engagement of the second brake (04) and the first and the third clutches (13 and 36, 27);
   a sixth forward gear is attained by engagement of the first, the second and the third clutched (13 and 36, 35, 27);
   a seventh forward gear is attained by engagement of the second brake (04) and the second and the third clutches (35, 27);
   an eighth forward gear is attained by engagement of the first brake (03) and the second and the third clutches (35, 27);
   a ninth forward gear is attained by engagement of the first and the second brakes (03, 04) and the third clutch (27); and
   the reverse gear is attained by engagement of the first and the second brakes (03, 04) and the fourth clutch (28).

\* \* \* \* \*